(12) United States Patent
Wulff et al.

(10) Patent No.: US 7,831,218 B2
(45) Date of Patent: Nov. 9, 2010

(54) MODULAR KEYPAD WITH WIRELESS ARRANGEMENT FOR A MOBILE DEVICE

(75) Inventors: Thomas Wulff, North Patchogue, NY (US); Carl Degiovine, Shirley, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 671 days.

(21) Appl. No.: 11/751,760

(22) Filed: May 22, 2007

(65) Prior Publication Data
US 2008/0293367 A1    Nov. 27, 2008

(51) Int. Cl.
*H04B 1/38* (2006.01)
(52) U.S. Cl. .................... 455/90.3; 455/557; 455/575.1
(58) Field of Classification Search ............... 455/558, 455/550.1, 90.3, 566, 575.1
See application file for complete search history.

(56) References Cited

U.S. PATENT DOCUMENTS

| | | | | |
|---|---|---|---|---|
| 6,133,833 A | * | 10/2000 | Sidlauskas et al. | 340/572.1 |
| 2002/0082042 A1 | * | 6/2002 | Mark et al. | 455/550 |
| 2004/0198447 A1 | * | 10/2004 | Larsson | 455/558 |
| 2007/0135120 A1 | * | 6/2007 | King et al. | 455/426.2 |

FOREIGN PATENT DOCUMENTS

| | | | | |
|---|---|---|---|---|
| JP | 2000032553 A | * | 1/2000 | |
| JP | 2006217485 A | * | 8/2006 | |
| WO | WO 2005027480 A1 | * | 3/2005 | |

* cited by examiner

*Primary Examiner*—Matthew D Anderson
*Assistant Examiner*—Gennadiy Tsvey

(57) ABSTRACT

Described is a mobile device comprising a base unit and a keypad detachably coupled to the base unit. The keypad includes an input arrangement and a first wireless arrangement operating in accordance with a first wireless protocol.

6 Claims, 6 Drawing Sheets

MODULAR KEYPAD WITH WIRELESS ARRANGEMENT FOR A MOBILE DEVICE

FIELD OF INVENTION

The present application generally relates to modular keypads for a mobile device.

BACKGROUND INFORMATION

Mobile devices (e.g., barcode scanners, image-based scanners, RFID readers, radio transceivers, video recorders, etc.) often include wireless arrangements for communicating or interacting with wireless routers, network access points and other wirelessly enabled devices. In some mobile applications, it is desirable to operate a mobile device using multiple types of wireless connectivity. For instance, a mobile application may utilize multiple wireless protocols either simultaneously or alone. Reasons for operating under a plurality of wireless connectivity conditions vary and may include a desire to extend a functionality of the mobile device, maintain connectivity amidst changing network conditions (e.g., conditions in a wide area network ("WAN"), a local area network ("LAN"), a global positioning system ("GPS") network, a cell phone network (e.g., a Global System for Mobile Communications ("GSM") or a Code Division Multiple Access ("CDMA") network), an RFID network or a Bluetooth network), and communicate with networks that utilize legacy protocols. As will be discussed, operation of the mobile device may occur under a variety of network conditions, which may affect wireless communication between the device and one or more networks.

A conventional wireless mobile device generally includes an integral wireless arrangement that operates using a single wireless protocol. Thus, the conventional wireless mobile device cannot support the wireless connectivity previously described. In some instances, a need for multiple types of wireless connectivity is foreseeable and the conventional wireless mobile device may be pre-configured to support multiple wireless protocols. However, even when such a need is foreseeable, it may be desirable to enable the conventional device to support future protocols, which are not yet available and/or unforeseen. It may also be desirable to limit the number of protocols supported by the device for reasons such as cost, weight and performance (e.g., power consumption).

SUMMARY OF THE INVENTION

The present invention relates to a mobile device comprising a base unit and a keypad detachably coupled to the base unit. The keypad includes an input arrangement and a first wireless arrangement operating in accordance with a first wireless protocol.

The present invention also relates to a mobile device comprising a base unit including a first wireless arrangement and a keypad detachably coupled to the base unit. The keypad includes an input arrangement and a memory storing a first wireless protocol.

The present invention also relates to a mobile device comprising a base unit and a keypad detachably coupled to the base unit. The keypad includes an input means and a first wireless means operating in accordance with a first wireless protocol.

DETAILED DESCRIPTION

Figure 1:
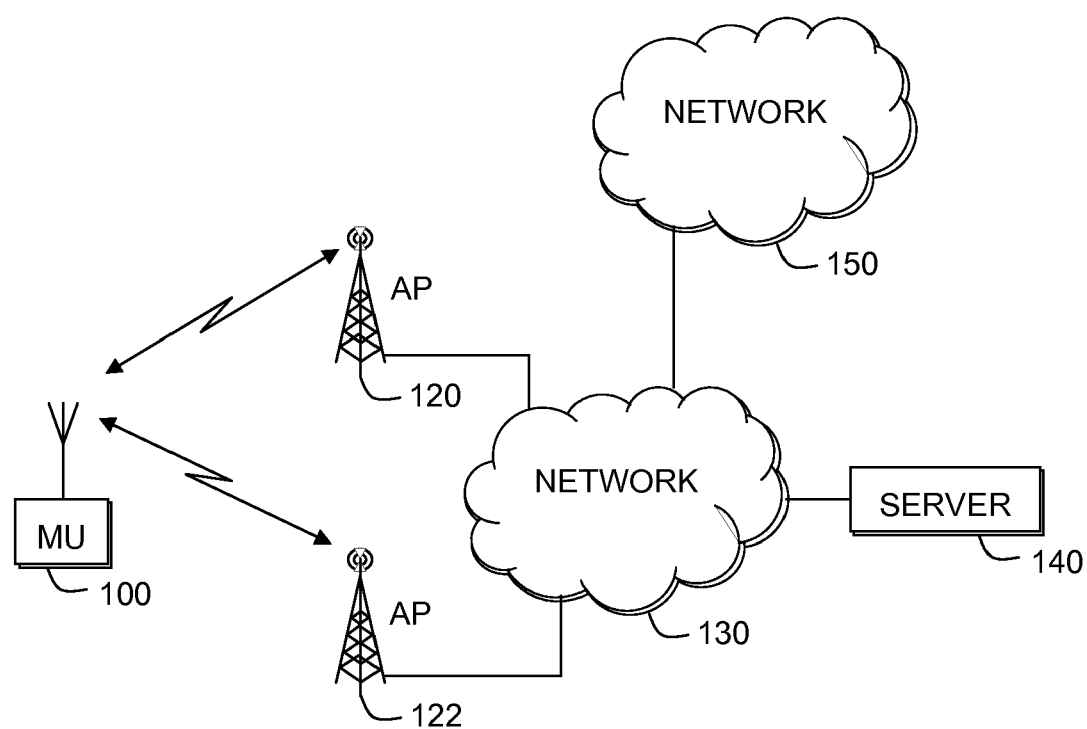
FIG. 1 shows an exemplary embodiment of a system according to the present invention.

The present invention may be further understood with reference to the following description and the appended drawings, wherein like elements are provided with the same reference numerals. The present invention relates to modular keypads for a mobile device. Various embodiments of the present invention will be described with reference to a mobile device (e.g., a barcode scanner). However, those skilled in the art will understand that the present invention may be implemented with any mobile device that is capable of wireless communication or operation. Thus, the present invention may encompass a variety of mobile devices including, but not limited to, mobile computers, RFID readers, image- or laser-based scanners, video recorders, media players, cell phones and radios.

FIG. 1 shows an exemplary embodiment of a system 50 according to the present invention. The system 50 may include a mobile device 100 in wireless communication with one or more wireless networks, including a network 130, which may be a wide area network ("WAN"), a local area network ("LAN"), a global positioning system ("GPS") network, a cell phone network (e.g., a Global System for Mobile Communications ("GSM") or a Code Division Multiple Access ("CDMA") network), an RFID network, a Bluetooth network, etc. The mobile device may comprise a mobile unit ("MU") 100 such as a barcode scanner communicating with wireless access points ("APs") 120 and 122. The APs 120, 122 may function as base stations or gateways providing access to the network 130, which may comprise any number of wired and/or wireless computing devices such as routers, switches and servers. As will be discussed further below, the network 130 may be comprised of one or more sub-networks, each of which may, in some embodiments, be operated by different service providers. The network 130 may be coupled to a further network 150, which may be a sub-network, a separate network, the Internet, etc. The system 50 may also include a server 140 coupled to the network 130.

The system 50 illustrates a general network environment in which the MU 100 is in wireless communication with the network 130 via the APs 120, 122. The network 130 may provide the MU 100 with access to further resources, such as the network 150 and the server 140. Communication between the MU 100 and each of the above mentioned resources may be unidirectional (e.g., the MU 100 requests a web page from the Internet) or bi-directional (e.g., data is transmitted back and forth between the MU 100 and the server 140). Communication between the MU 100 and the APs 120, 122 may be performed using different wireless communications protocols. For example, if the network 130 is the LAN, the AP 120 may utilize a first IEEE 802.11 protocol (e.g., 802.11g) while the AP 122 may utilize a second IEEE 802.11 protocol (e.g., 802.11n). In other embodiments, the APs 120, 122 may communicate using the same wireless communications protocol. As will be discussed below, the MU 100 may encounter a variety of network conditions during a course of operation. These conditions may require the MU 100 to adjust wireless communications by, for example, switching communications protocols. Thus, wireless connectivity of the system 50 may not be fixed, but rather may vary depending on a particular network condition.

Exemplary embodiments of the present invention will now be described with reference to a mobile device which includes a modular keypad. According to the present invention, the modular keypad enables the mobile device to communicate using different wireless protocols. As will be discussed in detail below, an ability to communicate using a particular protocol may be built into the modular keypad. Furthermore, the modular keypad may be detachable from the mobile device, either in its entirety (e.g., as a single unit) or in part (e.g., only a component of the modular keypad that enables communication over the particular protocol may be removed).

Figure 2:
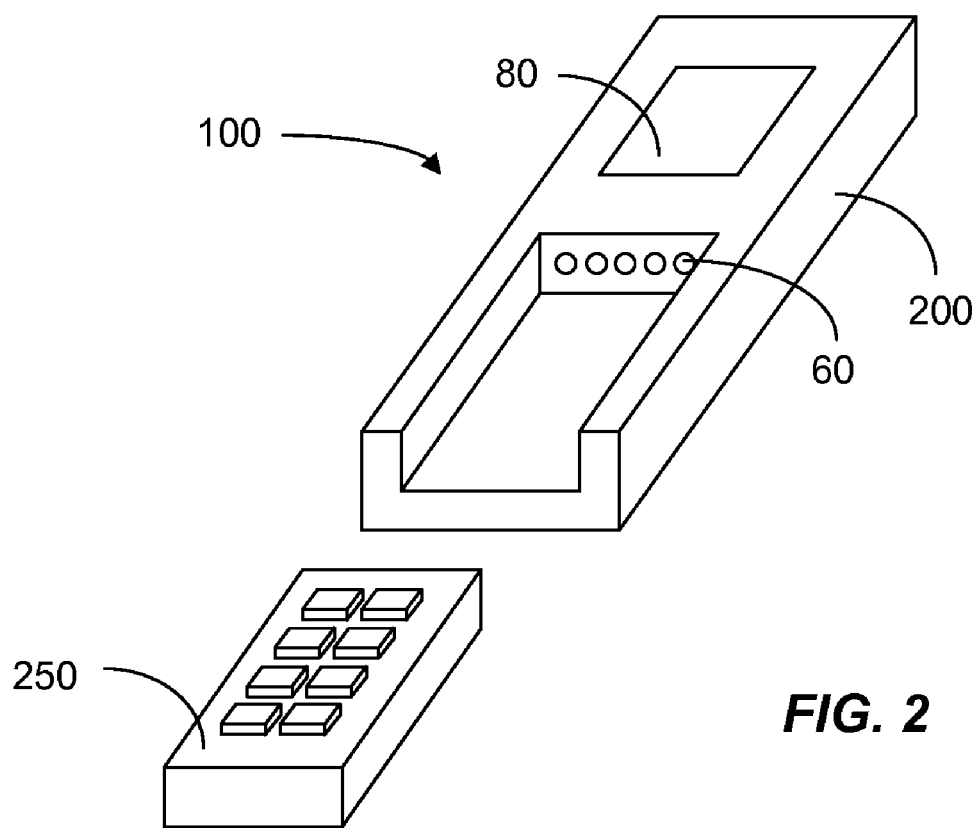
FIG. 2 shows an exemplary embodiment of a mobile device in a detached configuration according to the present invention.

FIG. 2 shows an exemplary embodiment of the MU 100 in a detached configuration. As shown in FIG. 2, the MU 100 may comprise a base unit 200 detachably coupled to the modular keypad 250. The base unit 200 may include an output arrangement such as a display 80. As will be discussed in further detail below, the modular keypad 250 may include an input arrangement and a wireless arrangement (e.g., a wireless transceiver). Communication between the base unit 200 and the modular keypad 250 may occur over one or more electrical contacts 60 located on a housing of the base unit 200.

Figure 3:
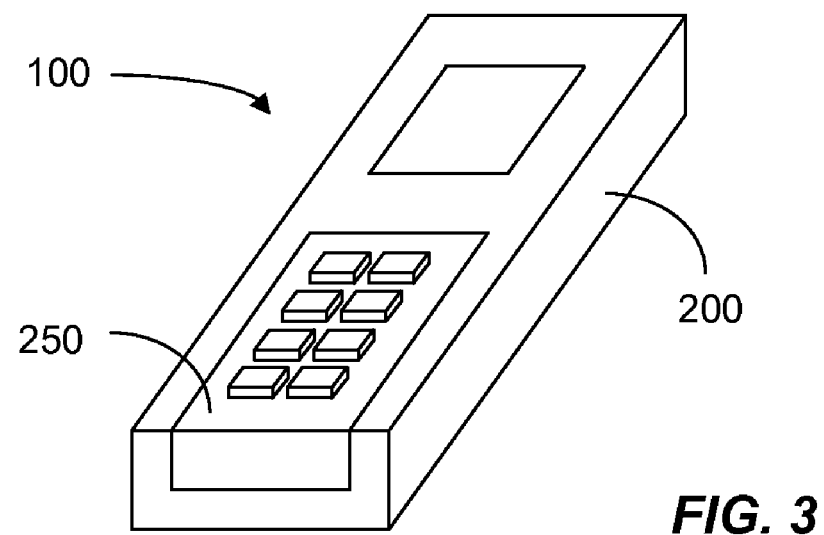
FIG. 3 shows the exemplary mobile device of FIG. 2 in an attached configuration.

FIG. 3 shows an exemplary embodiment of the MU 100 in an attached configuration. In the exemplary embodiment shown, the housing of the base unit 200 may be shaped to mate with a housing of the modular keypad 250. For example, FIG. 3 shows that the modular keypad 250 may be shaped to slide into the housing of the base unit 200. In another embodiment, the modular keypad 250 may be shaped to abut the base unit 200, forming an extension thereof. Attachment methods may include snap locks, friction fitting, Velcro®, magnets, straps and other methods known in the art.

The exemplary embodiments shown in FIGS. 2 and 3 utilize a modular keypad that is detachable from the base unit 200. However, in other embodiments, the modular keypad 250 may be fixedly attached to, or formed integrally with, the housing of the base unit 200. In these additional embodiments, one or more components of the modular keypad 250 (e.g., the wireless arrangement) may be detachable with respect to the modular keypad 250 itself while other components (e.g., the input arrangement) may be permanently attached to the modular keypad 250. Thus, depending on a particular embodiment, the modular keypad 250 may be removed and reattached either in its entirety or in part. An exemplary embodiment of a non-detachable modular keypad will now be described.

Figure 4:
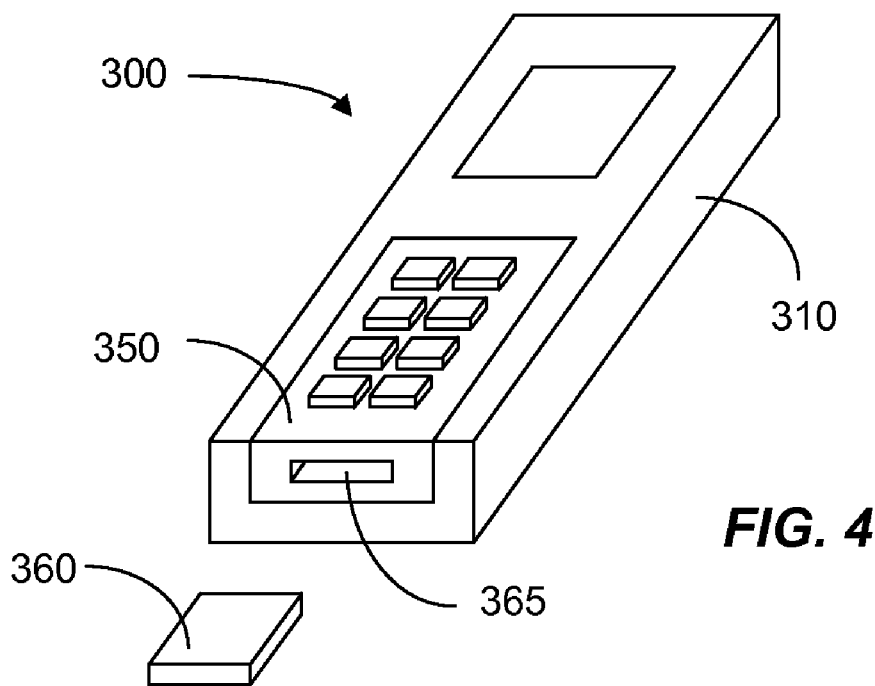
FIG. 4 shows another exemplary embodiment of a mobile device in a detached configuration according to the present invention.

FIG. 4 shows an exemplary embodiment of an MU 300 in a detached configuration. The MU 300 includes a non-detachable modular keypad 350 which is fixedly attached to a housing 310 of the MU 300. As shown in FIG. 4, the modular keypad 350 may include a receiving arrangement (e.g., a slot 365) for attaching a keypad component (e.g., a wireless arrangement 360) thereto. In other embodiments, the keypad component may comprise any number and/or type of components, including a Subscriber Identity Module ("SIM") card, an antenna, a power supply (e.g., a battery) and other discrete components.

Figure 5:
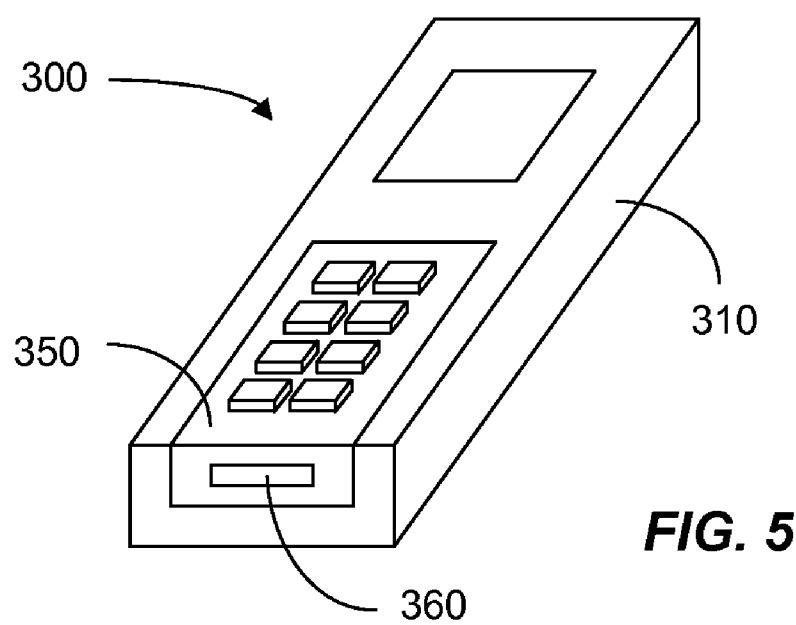
FIG. 5 shows the exemplary mobile device of FIG. 4 in an attached configuration.

FIG. 5 shows an exemplary embodiment of the MU 300 in an attached configuration in which the wireless arrangement 360 is attached to the modular keypad 350. A method by which the wireless arrangement 360 is attached may be substantially similar to those described above with reference to FIGS. 2 and 3 (e.g., snap locks, friction fitting, Velcro®, magnets, straps and other methods known in the art).

Figure 6:
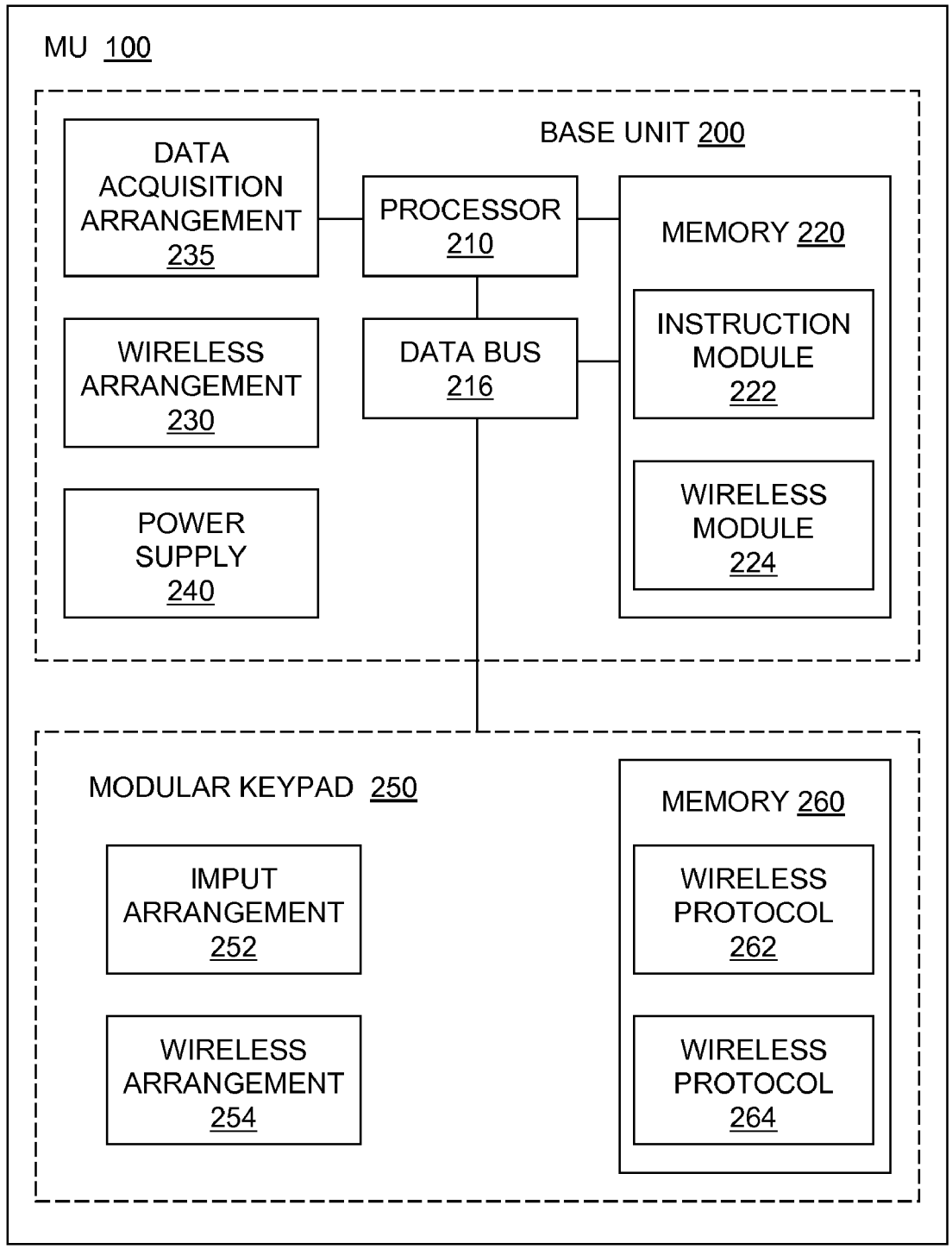
FIG. 6 shows an exemplary block diagram of the mobile device of FIG. 2.

FIG. 6 shows an exemplary block diagram of the MU 100. The base unit 200 may include a processor 210, which may be a microprocessor, one or more integrated circuits (e.g., an application-specific integrated circuit), etc. The processor 210 controls the operation of the MU 100 by processing data and/or instructions transmitted between the MU 100 and a user (e.g., through the input arrangement of the modular keypad 250) in addition to processing program data/instructions stored in a memory 220 of the base unit 200.

The base unit 200 may further include a data acquisition arrangement 235 (e.g., a barcode scanner, an imager, an RFID reader, etc.). The data acquisition arrangement 235 may include a combination of hardware and/or software for capturing and processing barcode images such as a barcode scanning laser and an image processing circuit. The data acquisition arrangement 235 may be controlled by the processor 210 in response to the user's input (e.g., initiating scanning through the input arrangement).

The memory 220 may include one or more types of readable and/or writable memory such as random access memory, Flash memory, erasable programmable read-only memory, etc. The memory 220 may also include other types of storage mediums such as a hard drive or a compact disc. The memory may comprise one or more storage modules such as an instruction module 222 and a wireless module 224. The instruction module 222 may contain data and/or instructions required for operations, such as operating system code, various parameter values and program code providing a specific functionality (e.g., a barcode scanning procedure code). The wireless module 224 may contain data required for wireless communications between the MU 100 and another device (e.g., the APs 120, 122). In one embodiment, the wireless module 224 includes a single wireless protocol (e.g., the 802.11g protocol) for communication with the AP 120. In other embodiments, the wireless module 224 may include multiple wireless protocols.

The wireless arrangement 230 may comprise a combination of hardware and/or software which enable wireless communications. For example, the wireless arrangement 230 may include an antenna, an analog-to-digital converter, signal processing circuitry, etc. The wireless module 224 instructs the processor 210 on how the wireless arrangement 230 should be operated in order to communicate wirelessly (e.g., in accordance with the 802.11g protocol).

A data bus 216 provides for communication between the various components of the MU 100. For example, the data bus 216 may comprise one or more data paths (e.g., bus lines) between the processor 210 and the memory 220. The data bus 216 may include a traffic controller for handling inter-device data traffic (e.g., between the MU 100 and the network 130). As will be discussed below, the data bus 216 may also handle intra-device data traffic (e.g., between the base unit 200 and the modular keypad 250). Thus, the data bus 216 may be directly coupled to the one or more electrical contacts 60.

The MU 100 may include a power supply 240 which provides power to the various components thereof. The power supply 240 may be a rechargeable energy source (e.g., a rechargeable battery) and may also be physically detached from the base unit 200. In other embodiments, the power supply 240 may not be rechargeable (e.g., a disposable battery) or may be integral with the base unit 200. In an exemplary embodiment, the power supply 240 may also provide power to the modular keypad 250. Alternatively, the modular keypad 250 may be self-powered.

The modular keypad 250 may include the input arrangement (e.g., an input arrangement 252), a wireless arrangement 254 and a memory 260. The input arrangement 252 captures user input and may include any number of input devices, such as a touchpad (e.g., a resistive, a capacitive, an inductive or a pressure-sensitive touchpad), a keypad arrangement or keyboard, a touch-sensitive display, etc. The input arrangement 252 may comprise a required input arrangement of the MU 100. That is, in order to operate the MU 100 the user engages the input arrangement 252, which requires that the modular keypad 250 be attached to the base unit 200. In other embodiments, the input arrangement 252 may be a secondary input arrangement used to perform specialized functions (e.g., device programming) while an input arrangement of the base unit 200 is used to access primary functions of the MU 100 (e.g., barcode scanning). Thus, it may be possible for the base unit 200 to function as a stand-alone unit without an attached modular keypad.

The wireless arrangement 254 may include components substantially similar to those of the wireless arrangement 230, such as an antenna and a signal processing circuit. The wireless arrangement 254 comprises a wireless transceiver, which may be integrated as part of the modular keypad 250, or may be a separate module residing, for example, underneath or within the modular keypad 250. The modular keypad 250 may be easily removed by conventional means (e.g., sliding) to access the module. The modular keypad 250 may be added, replaced, or changed (e.g., changing to a different function, changing between WAN networks, adding an RFID reader, etc.) at a manufacturing (e.g., factory), an information technology ("IT") or an end-user level. The wireless arrangement 254 may comprise an entire sub-system. For example, the wireless arrangement 254 may comprise a WAN module that includes a radio (e.g., the wireless transceiver), a SIM card, a power supply, an antenna, discrete components, etc.). Those skilled in the art will understand that the adding, replacing and changing may also be applied to each of the components in the wireless arrangement 254 depending on a particular embodiment.

Operation of the wireless arrangement 254 may be governed by one or more wireless protocols 262 and 264 located in a memory 260 of the modular keypad 250. In an exemplary embodiment, the modular keypad 250 may not include any instruction processing hardware such as a processor or controller. Thus, the wireless protocols 262, 264 may be transferred to the processor 210 via the data bus 216, which transmits the protocols 262, 264 to the processor 210. The processor 210 then controls the operation of the wireless arrangement 254 and/or other components of the modular keypad 250. In some embodiments the processor 210 may not directly read from the memory 260. For example, the contents of the memory 260 may be stored in a temporary memory (e.g., within the memory 220) from which the processor 210 reads. In embodiments where the modular keypad 250 includes a processor or controller, the modular keypad 250 may directly control the wireless arrangement 254 in response to instructions from the processor 210 and/or user input. Thus, the wireless arrangement 254 may function as a substitute for the wireless arrangement 230. In some embodiments, the base unit 200 may not include any wireless arrangements, in which case the MU 100 may rely exclusively on the wireless arrangement 254 for wireless communications.

The memory 260 may include components substantially similar to those of the memory 220 and may include any combination of readable and/or writable storage mediums. As discussed above, the memory 260 may store the wireless protocols 262, 264. In one embodiment, the protocol 262 may be the 802.11g protocol. The protocol 264 may be a different wireless protocol. For example, although wireless protocols have been discussed with reference to LAN protocols such as 802.11g, the protocols utilized by the MU 100 may include other types of wireless standards such as a WAN protocol, an RFID protocol, a GPS protocol, a CDMA protocol, or any other data communication/wireless protocol. Those skilled in the art will understand the type of protocol utilized may be device and/or user dependent. For example, the protocol 264 may be the GSM or the CDMA protocol. The memory 260 may also store additional data that is not included in the base unit 200. For example, in one embodiment the memory 260 may include a SIM card that stores user information and enables access to the GSM network.

Figure 7:
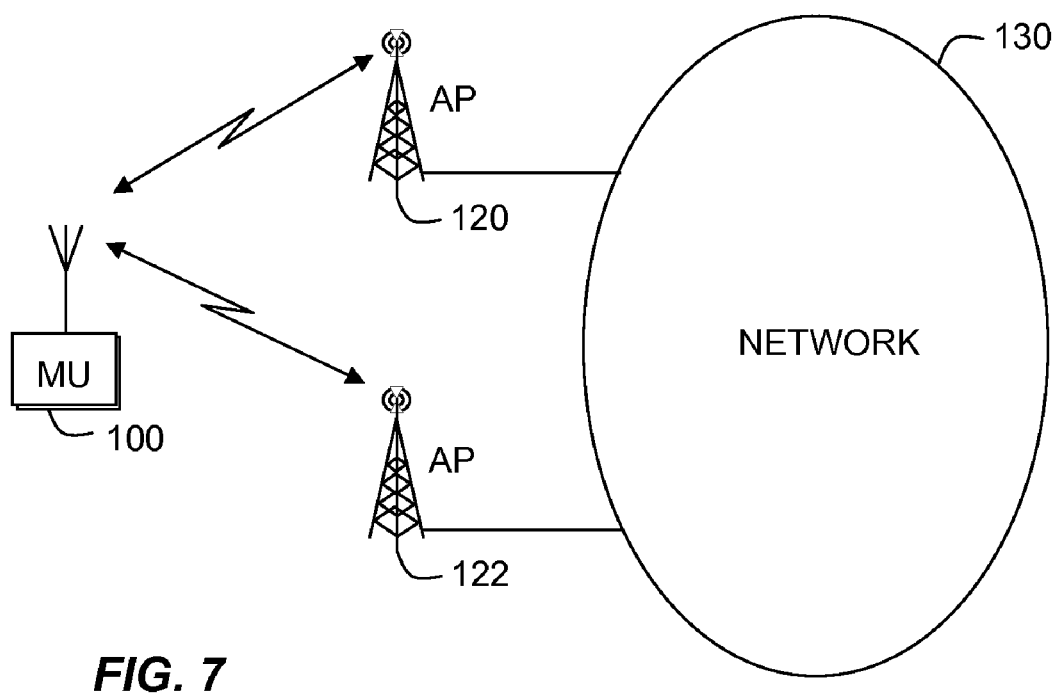
FIG. 7 shows the mobile device of FIG. 2 in a first exemplary network environment.

FIG. 7 shows the MU 100 in a first exemplary network environment in which the APs 120, 122 are operated by a single service provider such as an Internet service provider, a wireless communications (e.g., cell phone) service provider, a network resource provider, etc. In one embodiment, the single service provider may provide a data transfer service. For example, the network 130 may enable downloading and/or uploading of data (e.g., barcode data) to/from the server 140. Thus, if the user is handling barcode objects in a field environment (e.g., delivering packages), the MU 100 may access the server 140 via one or more nearby APs (e.g., the APs 120, 122) in order to maintain a package database. As shown in FIG. 7, the MU 100 is in wireless communication with the AP 122 but not the AP 120. The lack of communication between the MU 100 and the AP 120 may occur as a result of changing network conditions, such as the MU 100 moving out of communication range, physical obstructions that block wireless signals (e.g., buildings), service interruptions and other network conditions.

Under the first network environment, the APs 120, 122 may generally provide access to the same resource (e.g., the server 140, the Internet, etc.). As previously discussed, the APs 120, 122 may utilize different wireless protocols. Thus, in the first network environment the APs may provide a redundancy in which one AP functions as a backup in case communication between the MU 100 and the other AP fails. It may be desirable to utilize different protocols because a source of a communication problem may involve the MU's 100 ability to communicate using a particular protocol. For example, the protocol utilized by the AP 120 may operate on a wireless frequency which, due to network conditions, is less effective than a different frequency. Another example is when the MU 100 is unable to communicate with the AP 120 because of a malfunction or defect such as a failure of the wireless arrangement 230 or corruption of the memory 220.

The MU 100 may circumvent the communication problem with the AP 120 by instead communicating with the AP 122. To enable communication, the MU 100 may access a wireless protocol located in the modular keypad 250 (e.g., the protocol 262). The modular keypad 250 may, in some instances, already be attached to the base unit 200. In other instances, the base unit 200 may not have any attached modular keypads or a currently attached modular keypad may not support the protocol 262. Thus, accessing the protocol 262 may require switching modular keypads.

As previously discussed, the wireless arrangement 254 may function as a substitute for the wireless arrangement 230. Thus, access of the protocol 262 may involve the modular keypad 250 functioning as an intermediary between the base unit 200 and the AP 122. In other embodiments, the base unit 200 may communicate directly with the AP 122 by reading the wireless protocol 262 and operating the wireless arrangement 230 in accordance with the protocol 262.

A determination to switch from using the wireless arrangement 230 to using the wireless arrangement 254, or a determination to switch to a different wireless protocol (e.g., the protocol 262) may be automatically performed by the MU 100 in response to a detection of a change in network condition. For example, the MU 100 may monitor a signal strength between the MU 100 and each of the APs 120, 122. The change in network condition may weaken the signal strength (e.g., between the MU 100 and the AP 120) or result in no signal at all. In response, the MU 100 will make the switch (e.g., to the AP 122). In some embodiments, the switch may be performed manually. For example, the base unit 100 may be programmed to automatically switch to the protocol 262 when the modular keypad 250 is attached or the user may input a command to perform the switch.

Figure 8:
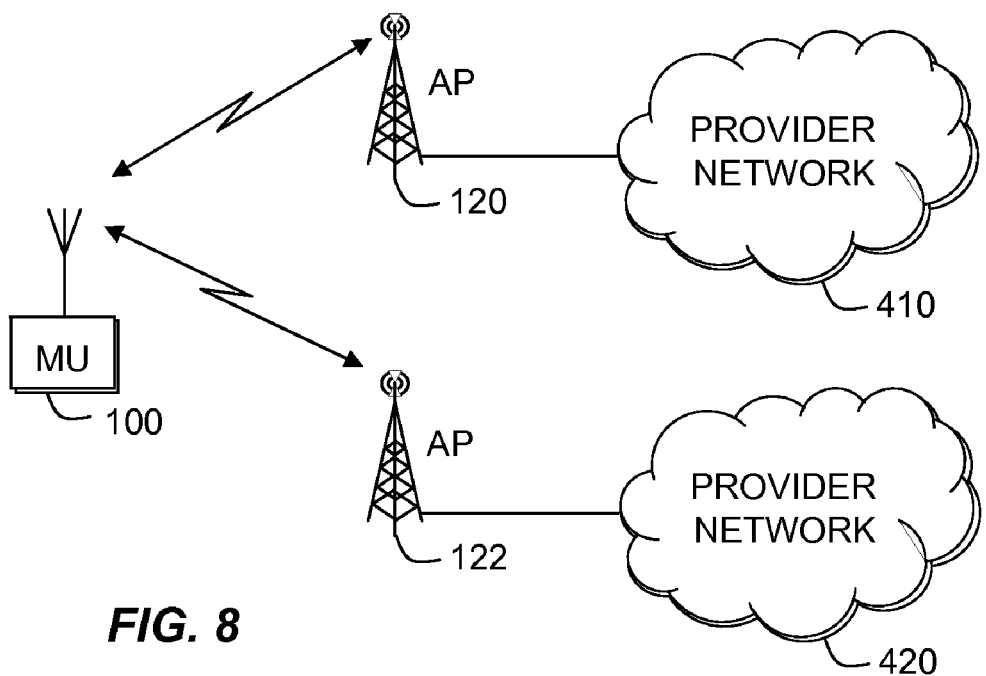
FIG. 8 shows the mobile device of FIG. 2 in a second exemplary network environment.

FIG. 8 shows the MU 100 in a second exemplary network environment in which the MU 100 is in wireless communication with both the APs 120, 122. As shown in FIG. 8, the MU 100 may access a plurality of networks. For example, the APs 120, 122 may be respectively coupled to first and second provider networks 410 and 420. Each of the provider networks 410, 420 may be operated by a separate service provider. In one embodiment, the provider networks comprise separately controlled sub-networks of a main network (e.g., the network 130). In other embodiments, the networks 410, 420 may be independent. The providers need not provide the same type of service. For instance, the first provider may be a cell phone service provider while the second provider may be an Internet service provider. Thus, the user may wish to connect to each network 410, 420 in order to access different types of services. The base unit 200 may be equipped to communicate with the AP 120 without any additional information from the modular keypad 250 (e.g., the base unit 200 and the AP 120 use the same protocol). However, communication with the AP 122 may require use of the modular keypad 250 (e.g., reading the wireless protocol 262). Thus, the modular keypad 250 may enable the MU 100 to connect to a variety of networks which use different communication methods.

In another embodiment, the first and second providers may provide substantially similar services. For example, both networks 410, 420 may provide access to a data transfer service. Thus, the first and second providers may be in competition for the user's patronage. In such a situation, the user may have the option of selecting either provider for access to the data transfer service. Thus, the user may express a preference for a particular provider.

Although the first and second providers may provide similar services, each provider may have different networking requirements. For example, the networks 410, 420 may include proprietary hardware and/or software and may also operate using different networking standards. In one embodiment, the first provider may require that communications be performed using the GSM protocol, whereas the second provider may require the CDMA protocol.

Because of the different communications requirements, the MU 100 must support different wireless protocols (e.g., the GSM and CDMA protocols). As previously discussed, the base unit 200 may only support the 802.11g protocol. In order to communicate with the APs 120, 122, the base unit 200 may access the wireless protocols 262, 264, which respectively correspond to the GSM and CDMA protocols.

Although exemplary embodiments of the modular keypad 250 have been described as storing multiple wireless protocols, it may be desirable to limit the number of protocols supported in any given modular keypad. Supposing that the GSM and CDMA protocols had different hardware requirements, or supposing the first and second providers imposed their own hardware and/or software specifications, it may be prohibitively costly to implement the modular keypad 250 with support for both the GSM and the CDMA protocols. In cases where the modular keypad 250 only stores a single wireless protocol (e.g., the GSM protocol) the user may optionally purchase a compatible modular keypad to enable further wireless communication (e.g., using the CDMA protocol). However, there may also be situations in which it would not be too difficult and/or expensive to modify the modular keypad 250 (e.g., adding hardware to the wireless arrangement 254 or expanding a capacity of the memory 260). Thus, purchase of additional modular keypads may not be necessary.

Figure 9:
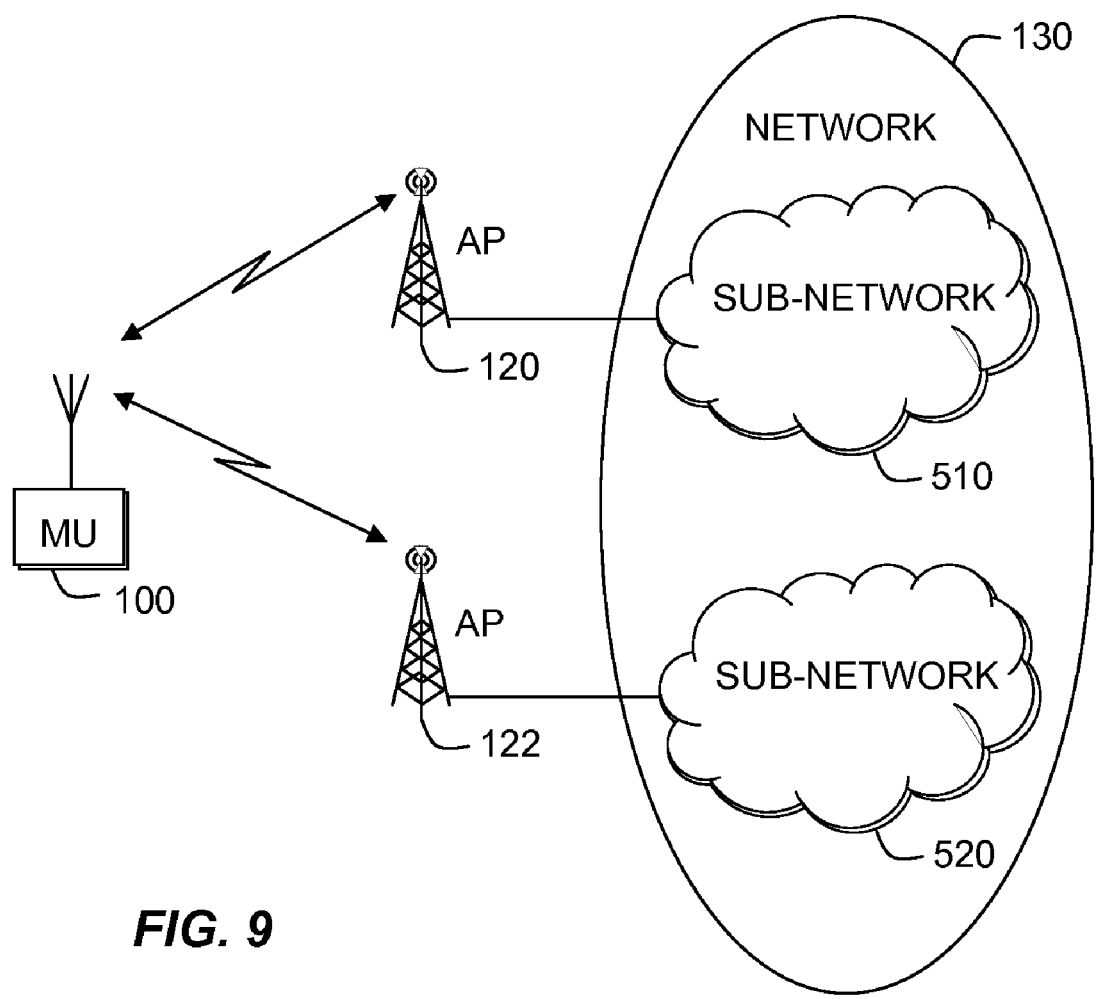
FIG. 9 shows the mobile device of FIG. 2 in a third exemplary network environment.

FIG. 9 shows the MU 100 in a third exemplary network environment in which the MU 100 is in wireless communication with both the APS 120, 122. Unlike the second network environment shown in FIG. 8, the MU 100 does not communicate with a plurality of providers. As shown in FIG. 9, the APs 120, 122 are respectively coupled to sub-networks 510 and 520 of the network 130. Thus, the sub-networks may be operated by a single service provider.

As with the provider networks 410, 420 of FIG. 8, the sub-networks 510 may provide the same type of service. For example, the sub-network 520 may be a backup network providing access to the same resources as the sub-network 510. Alternatively, the sub-networks 510 may provide different types of services. For example, many providers offer bundled service packages that provide consumers access to a variety of different services at a lower cost compared to purchasing each service individually.

Communication between the MU 100 and the APs 120, 122 in the third network environment of FIG. 9 may be substantially similar to communications under the second network environment previously described. The APs 120, 122 may utilize different wireless protocols, requiring the base unit 200 to access at least one wireless protocol stored within the memory 260 of the modular keypad 250. Even though both sub-networks 510, 520 are operated by the same provider, there are a variety of reasons why the APs 120, 122 may utilize different protocols. For example, the AP 120 or the sub-network 510 may include legacy equipment operating under an older protocol. The services provided by the APs 120, 122 may require specific protocols. Different protocols may also be desirable for ease and flexibility of access. Still other potential reasons will be apparent to those skilled in the art.

As shown in the exemplary embodiments described above, the present invention provides for wireless communication/ operation in a variety of different contexts. The present invention enables flexibility of use and expansion capabilities. The modular keypad 250 may be used to supplement existing functionalities of the base unit 200. For example, the MU 100 may operate both wireless arrangements 230, 254 concurrently, allowing the MU 100 to simultaneously communicate with one or more networks. In addition, a lifetime of existing devices may be extended using the modular keypad 250 rather than discarding the existing devices whenever a new application or mode of communication is required, since different mobile applications and/or different modes of wireless communication may require changes to hardware or software. Upgrading an existing device may be as simple as swapping modular keypads. Thus, the present invention may provide support for future applications.

The present invention also allows the user to choose between different service providers. The modular keypad 250 frees the user from being dependent upon any individual provider since the functionality of the base unit 200 can be extended to comply with the requirements of additional providers. The extension of functionality may not be limited to wireless communications. For example, a particular provider application may require new hardware such as a specific keypad arrangement. In such instances, a provider-specific modular keypad may be used in conjunction with the base unit 200. Thus the present invention may encompass both provider-specific and generic modular keypads. The user may select different providers based on any number of factors such as cost, services supported, reliability, etc. The user may also concurrently subscribe to different services from the same or different providers. To access each service, the user may swap the modular keypad 250 with a service-compatible modular keypad rather than switch to a new MU. Furthermore, the present invention may serve a backup function where the modular keypad 250 provides an alternate method of accessing service in the event of a change in network condition.

The present invention has been described with reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A mobile device, comprising:
   a base unit including a second wireless transceiver operable in accordance with a second wireless protocol;
   a keypad operable to be detachably coupled to the base unit, the keypad including an input arrangement and a first wireless transceiver operable in accordance with a first wireless protocol; and
   a second keypad operable to be detachably coupled to the base unit and having a third wireless transceiver operable in accordance with a third wireless protocol, wherein
   if the mobile device is unable to establish a communication link with a remote device and obtain service with either the first or second wireless transceiver, the second keypad is exchanged with the first keypad to provide service with the third wireless transceiver operable in accordance with the third wireless protocol.

2. The mobile device of claim 1, wherein the first wireless arrangement includes both a first wireless communications arrangement and a first RFID arrangement.

3. The mobile device of claim 1, wherein the first wireless arrangement is also detachable from the keypad.

4. The mobile device of claim 1, wherein the base unit includes a processor, and wherein the keypad includes a first wireless protocol for the first wireless arrangement in the keypad, and wherein the processor is operable to receive the first wireless protocol to control the first wireless arrangement in the keypad.

5. The mobile device of claim 1, wherein a choice between operating using the first wireless arrangement of the base unit and the second wireless arrangement of the keypad is user-selectable.

6. The mobile device of claim 1, wherein the mobile device automatically chooses between operating using the first wireless arrangement of the base unit and the second wireless arrangement the keypad.

* * * * *

UNITED STATES PATENT AND TRADEMARK OFFICE
CERTIFICATE OF CORRECTION

| | | |
|---|---|---|
| PATENT NO. | : 7,831,218 B2 | Page 1 of 1 |
| APPLICATION NO. | : 11/751760 | |
| DATED | : November 9, 2010 | |
| INVENTOR(S) | : Wulff et al. | |

It is certified that error appears in the above-identified patent and that said Letters Patent is hereby corrected as shown below:

IN THE DRAWINGS

1. In Fig. 6, Sheet 4 of 6, in Box "252", Line 1, delete "IMPUT" and insert -- INPUT --, therefor.

2. In Column 8, Line 26, delete "APS" and insert -- APs --, therefor.

3. In Column 10, Line 37, in Claim 6, delete "arrangement" and insert -- arrangement of --, therefor.

Signed and Sealed this
Seventh Day of August, 2012

David J. Kappos
*Director of the United States Patent and Trademark Office*